March 27, 1962 B. L. FLYNN 3,027,011
PULP WASHER AND FILTER
Filed Jan. 6, 1958 8 Sheets-Sheet 1

INVENTOR.
Ben L. Flynn
BY
Cromwell, Greist & Warden
Attys.

March 27, 1962

B. L. FLYNN 3,027,011

PULP WASHER AND FILTER

Filed Jan. 6, 1958

INVENTOR.
Ben L. Flynn
BY
Cromwell, Greist & Warden
Attys.

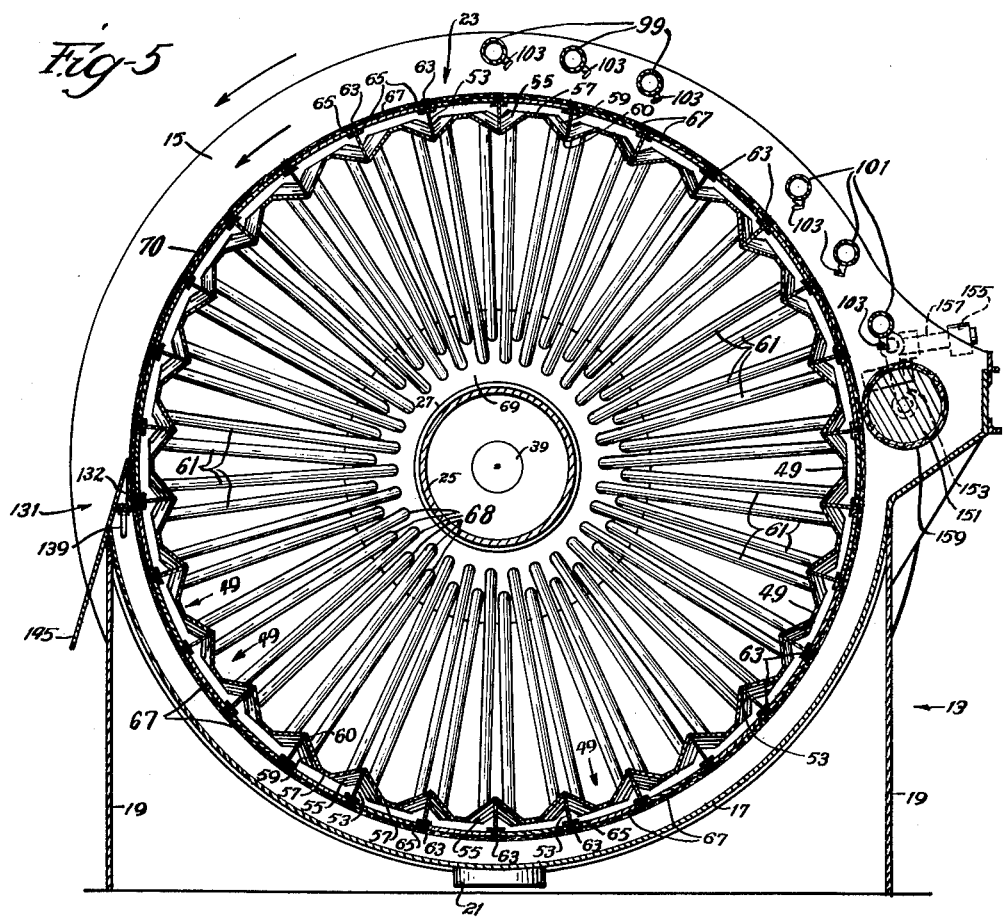

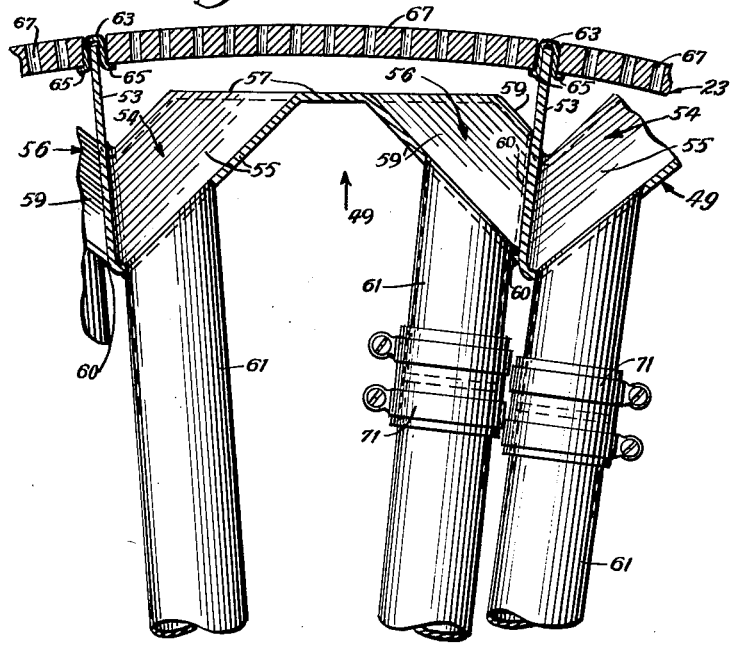
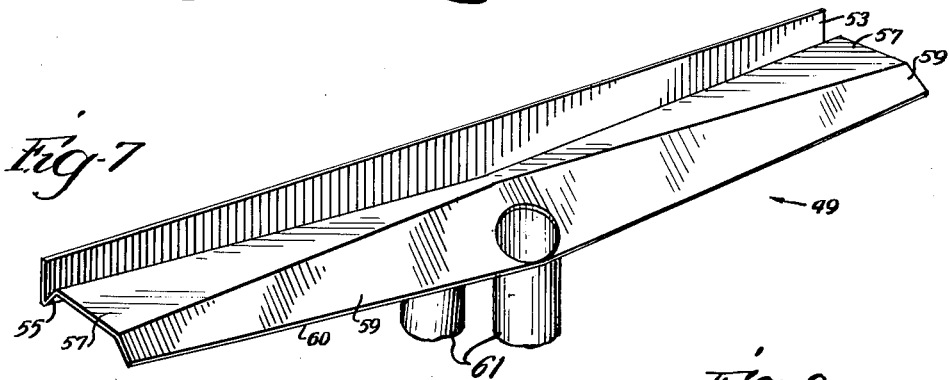
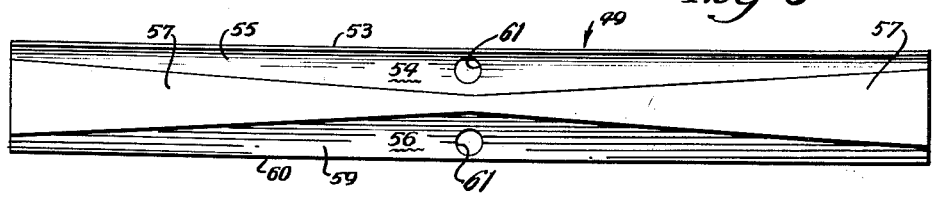

March 27, 1962  B. L. FLYNN  3,027,011
PULP WASHER AND FILTER
Filed Jan. 6, 1958  8 Sheets-Sheet 7
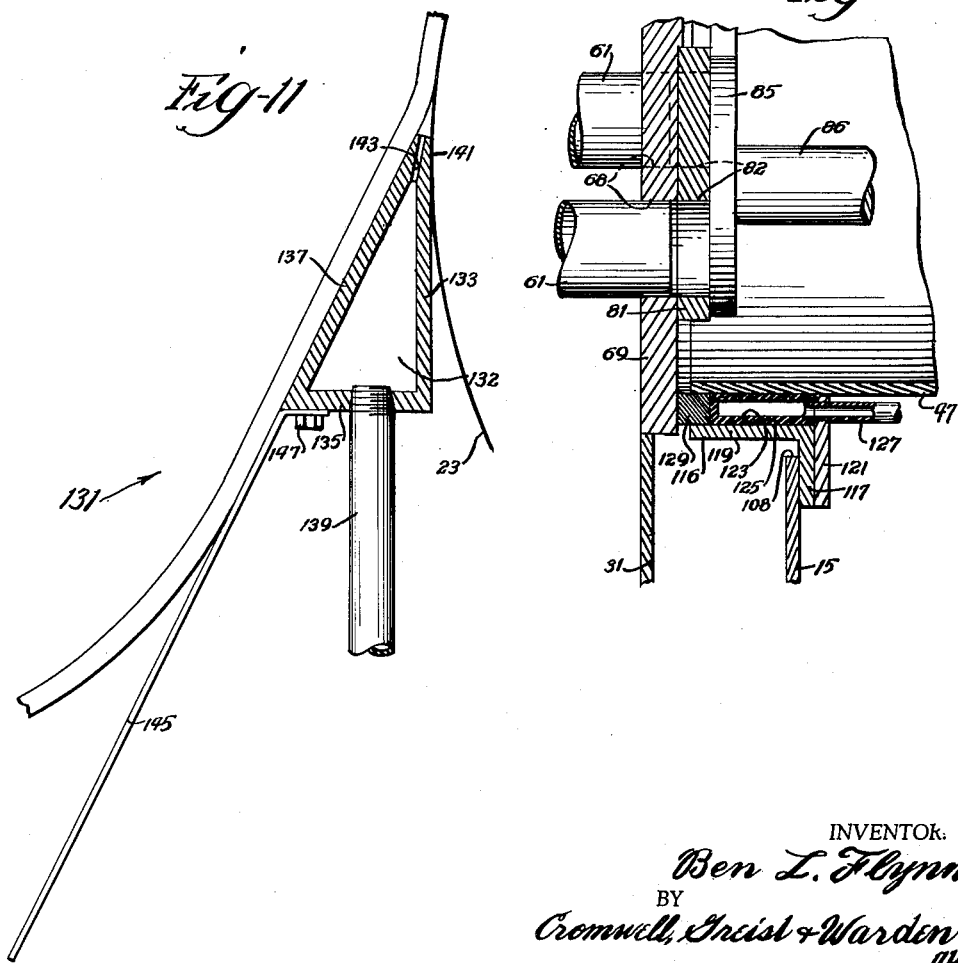
INVENTOR:
Ben L. Flynn
BY
Cromwell, Greist & Warden
Attys.

March 27, 1962 B. L. FLYNN 3,027,011
PULP WASHER AND FILTER
Filed Jan. 6, 1958 8 Sheets-Sheet 8

INVENTOR.
Ben L. Flynn
BY
Cromwell, Greist & Warden
Attys.

United States Patent Office 3,027,011
Patented Mar. 27, 1962

3,027,011
PULP WASHER AND FILTER
Ben L. Flynn, Harvey, Ill., assignor to Whiting Corporation, a corporation of Illinois
Filed Jan. 6, 1958, Ser. No. 707,228
6 Claims. (Cl. 210—404)

This invention relates, generally, to combination pulp washers and filters and, more particularly to innovations and improvements in rotary drum type pulp washers and filters.

The object of the invention, generally stated, is to provide improvements in pulp washers and filters of the rotary drum type such as those disclosed in Nyman Patent No. 2,362,300. Such washers and filters include a rotary drum circumferentially subdivided into a plurality of sectors extending lengthwise of the drum. These sectors have drainage troughs connected to a stationary suction housing disposed at an end of the drum, by conduits communicating between the drainage trough outlets and ports formed in a manifold plate disposed in the end of the drum. The rotary drum is mounted for rotation about a horizontal axis with the bottom portion submerged in a bath of pulp.

An important object of the invention is a combination pulp washer and filter of the rotary drum type, which may be quickly and easily converted from two-stage operation to single-stage operation, and vice versa.

Another object of the invention is to provide improved drainage decks for such rotary drum pulp washers and filters wherein a pair of drainage troughs in each sector increase progressively in both width and depth from opposite ends of the deck to the center thereof, and which drainage decks are simple to form and economical to produce inasmuch as they have a minimum number of bends, require a minimum amount of material, are easily installed in a rotary drum by welding from the outside, and provide a structurally strong drum element, the double tapered feature of the drainage troughs providing a uniform velocity of flow therealong so as to provide an even suction action longitudinally along each sector, thus improving functioning and the quality of the filter cake or layer of pulp.

It is another object of the invention to provide an improved rotary drum pulp washer and filter construction wherein abrupt angles in the flow path of the drainage fluid between each drainage trough and a port in a manifold plate in the end of the drum are substantially eliminated to minimize turbulence in the flow thereof.

Another important object of the invention is a combined pulp washer and filter of the rotary drum type wherein substantially increased and maximum use is made of the available filter area without encountering back flow of wash liquor and contamination of the washed pulp.

It is another object of the invention to provide in rotary drum pulp washers and filters improved sealing means between the rotatable filter drum and the stationary suction housing disposed at the end thereof.

It is still another object of the invention to provide an improved steam doctor for rotary drum pulp washers and filters and the like which is very economical to produce, requires a minimum of material, has substantially reduced steam requirements, and in which the amount of condensate is greatly reduced.

Still another object of the invention is to provide a combined pulp washer and filter of the rotary drum type wherein flow paths of minimum length are provided for removing fluid from the sectors of a drum of any given length by providing suction means at both ends of the rotary drum.

The combination of the foregoing interrelated improvements and innovations in a combined pulp washer and filter of the rotary drum type answers a long needed requirement in apparatus of this type.

Certain other objects of the invention will, in part, be obvious, and will in part appear hereinafter. For a more complete understanding of the nature and scope of the invention reference may now be had to the accompanying drawings wherein:

FIG. 5 is an enlarged vertical sectional view taken generally along line 5—5 of FIG. 1;

FIG. 6 is an enlarged detail sectional view taken generally along line 6—6 of FIG. 1;

FIG. 7 is a perspective view of an improved drainage deck utilized in the rotary drum pulp washer and filter of this invention;

FIG. 8 is a top plan view of the drainage deck shown in FIG. 7;

FIG. 9 is an enlarged vertical sectional view taken generally along line 9—9 of FIG. 1;

FIG. 10 is an enlarged detail sectional view corresponding to the lower left corner of FIG. 4 and showing a modified form of sealing means between the rotatable drum and stationary suction housing;

FIG. 11 is an enlarged vertical section view taken generally along line 11—11 of FIG. 2 and showing an improved steam doctor adapted for use with rotary drum pulp washers and filters.

Figure 1:
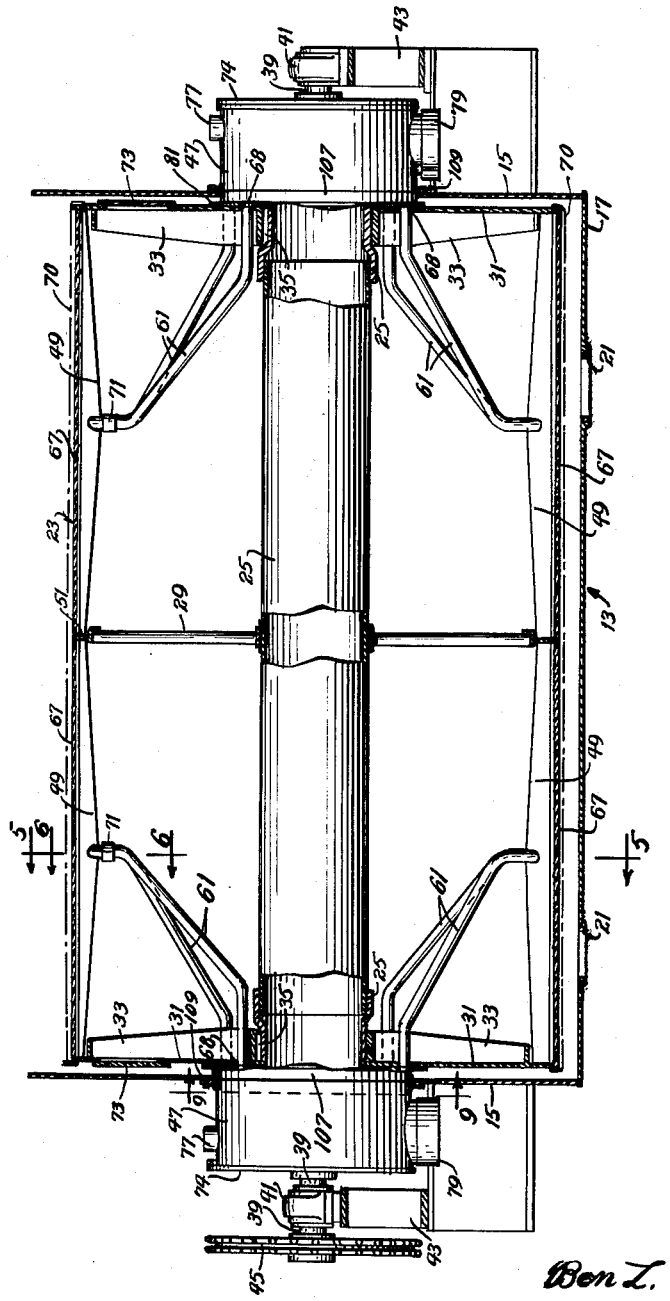
FIG. 1 is a vertical, longitudinal sectional view taken through a rotary drum type pulp washer and filter constituting a preferred embodiment of the invention, certain parts being shown in elevation and others being omitted.

A tank 13 for holding the pulp slurry to be washed and filtered is best shown in FIGS. 1 and 5 and includes a pair of generally circular end members 15, a generally semicylindrical trough-like member 17 extending therebetween, and a pair of vertically extending side members 19. A pair of normally closed drain openings 21 are provided in the lowermost portion of the trough member 17 to permit drainage of the pulp slurry therefrom when it is desired to empty or clean the tank 13.

Figure 4:
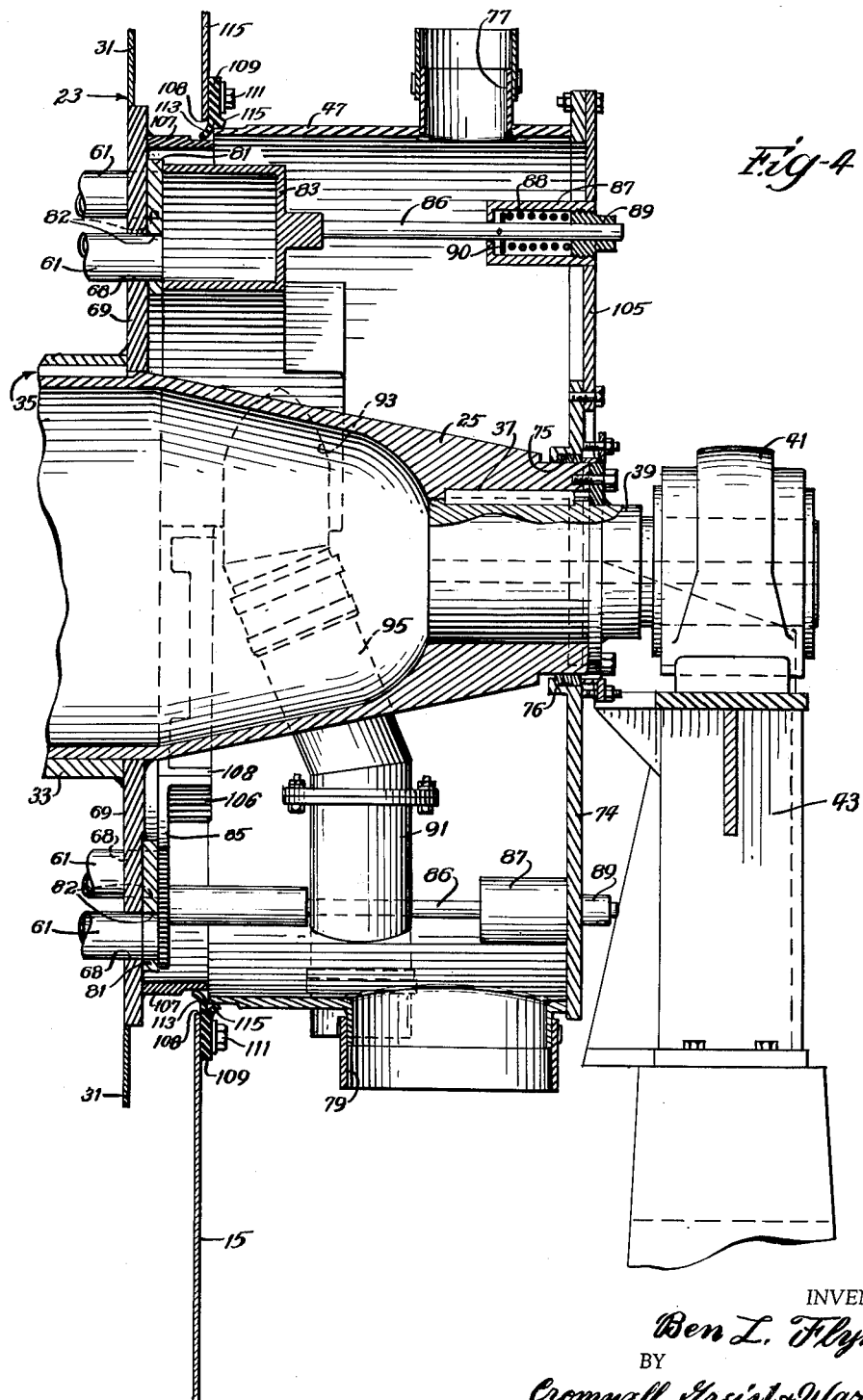
FIG. 4 is an enlarged vertical sectional view taken generally along line 4—4 of FIG. 3.

A rotary filter drum designated generally at 23, is supported for rotation in the trough 17. The drum 23 has a tubular center shaft 25 provided on opposite ends with a pair of trunnions 39. A supporting spider 29 is mounted at the mid-point of the shaft 25 to provide reinforcement and center support for the drum 23. A pair of drum ends 31 strengthened by web members 33 are supported on and keyed to the center shaft 25 by keys 35. As best shown in FIG. 4, the projecting ends of the center shaft 25 are interconnected, by keys 37, to trunnions 39 rotatably supported in pillow block bearings 41 mounted on supporting pillars 43 adjacent opposite ends of the tank 13. The trunnion 39, at the left end of the tank 13 as viewed in FIG. 1, is provided with a sprocket 45 adapted to be connected by suitable chains to a driving motor (not shown) for rotation of the drum 23 within the tank 13 at suitable speeds.

The rotary filter drum 23 is circumferentially subdivided into a plurality of sectors extending lengthwise thereof, each sector being connected through suitable conduits to suction housings or discharge heads 47 at opposite ends of the drum 23 to withdraw fluid or liquor from the layer of pulp or filter cake formed and carried on the surface of the drum 23. As shown in the drawings, left-hand and right-hand discharge heads 47 are provided at opposite ends of the drum 23 and it is divided lengthwise by the spider 29 into left-hand and right-hand sections or halves with the sectors in one half of the drum 23 discharging fluid or liquor to the correponding discharge head 47. With this arrangement minimum length flow paths for the liquor withdrawn from the pulp layer are provided for a filter drum of any given length. However, in general, the improvements disclosed herein are equally useful for either a double-ended filter drum of the type disclosed herein or for a filter of the type wherein liquor is withdrawn only from one end of the drum.

For brevity, inasmuch as both halves of the filter drum 23 are identical, only one half of the drum (i.e. the left half) will be described with the corresponding elements in the other half of the drum being identified by the same reference numerals.

The division of the outer circumference of the drum 23 into a plurality of sectors extending longitudinally of the drum is best shown and described with reference to FIG. 1 and FIGS. 5 to 8. In the embodiment disclosed herein each half of the drum 23 is circumferentially subdivided into thirty sectors which provide sixty separate drainage troughs independently connected to the discharge head 47 at the adjacent end of the drum 23. The sectors are defined by a plurality of longitudinally extending drainage decks indicated, generally, at 49 in FIGS. 7 and 8, secured between the drum ends 31 of the drum 23 and an annular flange 51 carried on the spider 29. The drainage decks 49 provide a pair of longitudinally extending drainage troughs in each sector. Obviously, in other embodiments the drainage decks could extend between the two drum ends of a filter drum.

Referring to FIGS. 6–8, each drainage deck 49 has a side portion 53 adapted to be disposed in a radial plane passing through the axis of the drum 23 and with the radially inner edge thereof being in the shape of a wide V so that each trough is deepest in the middle. A first angular portion 55 extends outwardly and away from the inner or bottom edge of the side portion 53 as viewed in FIGS. 6–8 with a chordal portion 57 extending away from the angular portion 55 and normal to a radial plane of the drum bisecting the sector. A second angular portion 59 extends inwardly and away from the chordal portion 57 with the terminal edge 60 being also in the shape of a wide V and lying in a radial plane through the axis of the drum 23. The terminal edge 60 engages the radially disposed side portion 53 of the next adjacent drainage deck 49 as shown in FIG. 6. As best shown in FIGS 7 and 8 each chordal portion 57 decreases progressively in width from the opposite ends of the deck 49 toward the center thereof. The drainage decks 49 thus provide a pair of drainage troughs in each sector, one, 54, being defined by the side portion 53 and the angular portion 55 and the other, 56, being defined by the angular portion 59 and the radially disposed side portion 53 of the next adjacent drainage deck 49. It will be seen that each drainage trough increases progressively in both width and depth from opposite ends toward the center thereof. Each drainage trough is connected at its deepest or center portion to the discharge head or suction housing 47 by a conduit 61 as will be further described.

The drainage decks 49 disclosed herein are economical to produce inasmuch as they may be formed or stamped out of sheet metal since they include only wide angles and a relatively small number of bends. Since there is no overlapping or double-thicknesses, maximum use is made of material. If stainless steel is used this efficient use of material is especially important. Because of their particular configuration each deck 49 also doubles as a structurally strong frame element in the drum 23. Additionally, these drainage decks 49 are conveniently assembled and secured in the drum 23 inasmuch as they may be secured in place by welding from outside instead of from the interior or otherwise. Thus, a very substantial savings in time and labor is made possible with superior construction being obtained.

Referring particularly to FIGS. 5 and 6, an elongated U-shaped member 63 is shown fitted over the outer edge of each of the radially disposed side portions 53 of the drainage decks 49 with such U-shaped members 63 having outwardly turned flange portions 65. Each sector is closed at the periphery by an arcuate, perforated filter plate 67 supported on the flange portions 65 in spaced relation to the filter deck 49 as shown. The perforated filter plates 67 are adapted to carry a filter cloth 70 upon which the layer of pulp or filter cake is formed and supported. It is noted that the plates 67 may be easily assembled in fabricating the drum 23 inasmuch as they may be spot welded to the U-shaped members 63 from the outside.

With each sector being subjected to suction action through one of the conduits 61, as will be hereinafter explained, the double-tapered drainage troughs 54 and 56 tend to provide a uniform velocity flow of fluid or liquor withdrawn from the layer of pulp or filter cake and also a uniform suction action on the filter cake along the length of each sector thereby giving an improved filter cake formation.

As shown in FIGS. 1 and 5, each discharge conduit 61 is connected to one of a series of ports 68 formed in a manifold plate 69 disposed in the drum end 31 of the drum 23 with each conduit 61 having a minimum of curvature and no sharp angles, so as to provide a turbulence-free flow path for fluid withdrawn from the layer of pulp or filter cake. Each conduit 61 is disposed substantially in a radial plane passing through the axis of the drum 23, as best shown in FIG. 5. It will be seen that hose clamps 71 (FIG. 6) may be used to connect the conduits 61 to the drainage troughs 54 and 56 to aid in assembly, particularly those conduits located opposite manholes or inspection plates 73 (FIG. 1) disposed in the ends of the drum 23.

The discharge head or suction housing 47 disposed at each end of the drum 23 is generally cylindrical in shape with an open end disposed toward the end of the drum so as to fit over the ports 68 in the manifold plate 69. Each housing 47 is stationary and the outer end wall 74 thereof has sealing gaskets 75 disposed in a central opening 76 so as to form a seal with the relatively rotatable trunnion 27. Additionally, the housing 47 is provided at the top with a suction opening 77 adapted to be connected to a source of suction and a bottom opening 79 for discharging fluid or liquor withdrawn from the layer of pulp or filter cake. The opening 79 provides the main or so-called "strong liquor" drainage opening for the discharge head 47. As will be explained below, during operation each head 47 is maintained under continuous suction or vacuum.

Valve means are provided in each discharge head 47 for controlling the sequential application of suction to the ports 68 in the manifold plate 69 and, thus, through the conduits 61 to the sectors of the drum 23. The construction and function of such valve means may be readily understood by reference to FIGS. 3, 4 and 9. As shown in FIG. 4, an annular wear plate 81 forms the outer surface of the manifold plate 69 and has openings 82 in communication with the ports 68 in the manifold plate 69. The valve means comprises a hollow valve shoe 83 adapted to overlap or embrace a considerable number of the openings 82 in the wear plate 81 and having one or more blocking or cover plates 85 extending therefrom adapted to cover or block off additional openings 82 in the wear plate 81. The valve shoe 83 and blocking plates 85 are supported and resiliently held against the wear plate 81 by means of spring-loaded plunger rods 86. The outer ends of the rods 86 extend through cups 87 which contain compression springs 88. The cups 87 are mounted on the inner side of the end wall 74 and are closed by plugs 89 which slidably receive the ends of the rods 86. A washer 90 is secured on each rod 86 within each cup 87 for pressure engagement by the spring 88, as shown.

A so-called "weak liquor" discharge pipe 91 extends upwardly into discharge head 47 and is adapted to be connected to a discharge opening 93 formed in the valve shoe 83 by a removable length of conduit 95. Exteriorly of the head 47, each weak liquor pipe 91 is connected with a vacuum line, as will be explained in connection with FIG. 12, to place the valve shoe 83 under a vacuum or suction.

Figure 3:
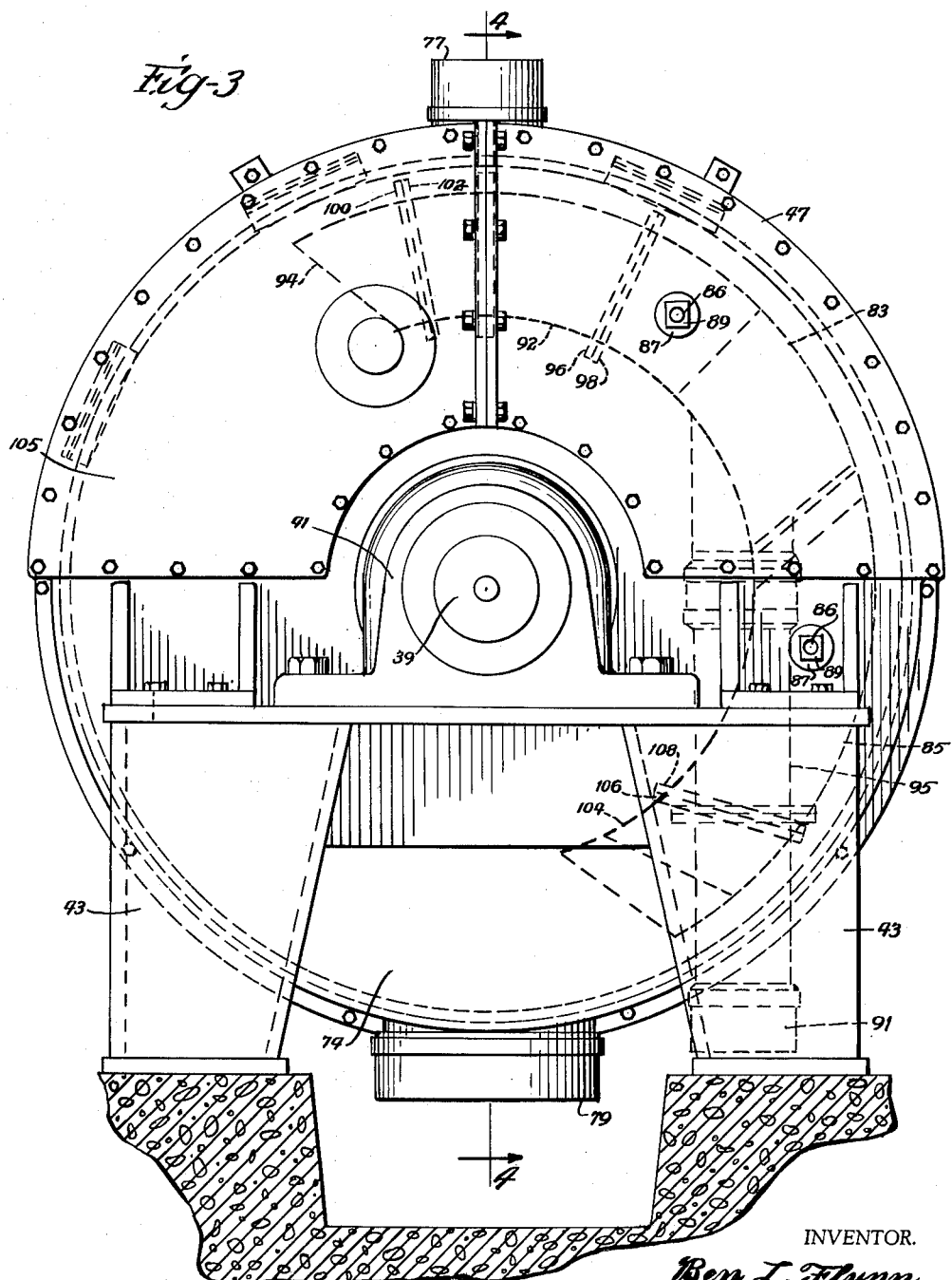
FIG. 3 is an enlarged left end elevational view of the pulp washer and filter as viewed in FIGS. 1 and 2.

Viewing the valve means as shown in FIGS. 3 and 9, it is evident that at any instant during the rotation of the drum 23 some of the openings 82 in the wear plate 81 will be blanked off from any suction while in alignment with the blocking plates 85, other openings 82 will be subjected to the suction within the valve shoe 83, and still other openings 82 will be subjected to the suction within the discharge head 47. Since each of the openings 82 communicates with one of the drum sectors, at any instant some of the sectors will be blocked off (i.e. not subjected to vacuum), others will be subject to the vacuum within the valve shoe 83 and still others will be subjected to the vacuum within the discharge head 47.

When the apparatus is used as a two-stage pulp washer and filter with the drum 23 rotating in a clockwise direction as viewed in FIGS. 3 and 9, the sectors as they are rotated downwardly into the tank 13 are first blocked off by plates 85 between approximately a 2:45 o'clock position and a 5:15 o'clock position, then exposed to the suction in the discharge head 47 between approximately a 5:15 o'clock position and a 11:15 o'clock position, and then exposed to the suction in the valve shoe 83 between approximately a 11:15 o'clock position and a 2:45 o'clock position until just before the layer of pulp or filter cake is removed from the drum 23 at approximately a 3:00 o'clock position by a doctor.

The particular number or arrangement of drum sectors to be subjected to the vacuum or suction in the valve shoe 83 or to be blocked off by the blocking plates 85 may be varied to suit the particular installation. Referring particularly to FIG. 3, extension members 92 and 94 are shown assembled to the valve shoe 83. The extension member 92 has an end flange 96 secured to an end flange 98 on the valve shoe 83 and the extension member 94 has an end flange 100 secured to a flange 102 at the other end of extension member 92. Similarly, an extension plate 104 is shown assembled to the blocking plate 85 by means of an end flange 106 secured to an end flange 108 on the blocking plate 85. For different washing and filtering operations, extensions to the valve shoe 83 and the blocking plate 85 may be added or removed from the apparatus as required for each washing and filtering operation. The upper half of the outer end wall 74 of the discharge head 47 is provided with a removable cover plate 105, FIGS. 3 and 4, to provide ready access to the interior of the discharge head 47 to vary the valve means as desired.

Figure 2:
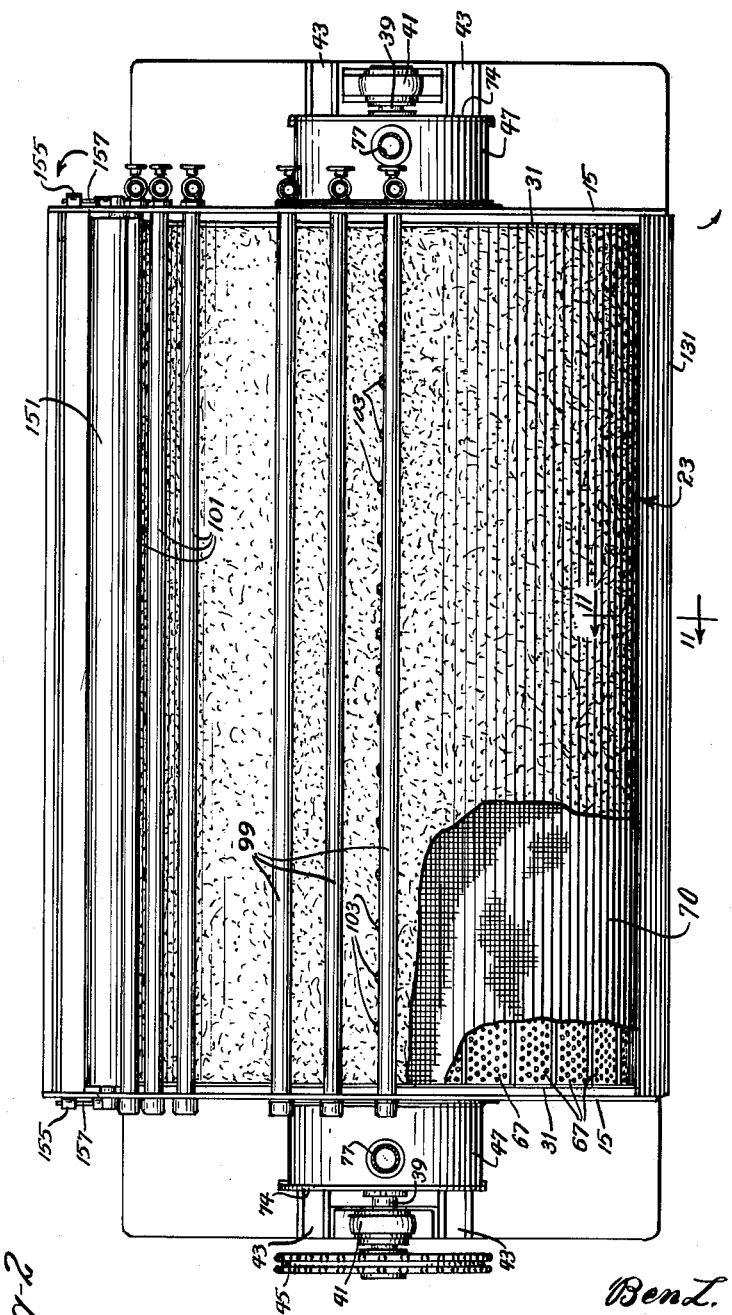
FIG. 2 is a top plan view of FIG. 1.
Figure 12:
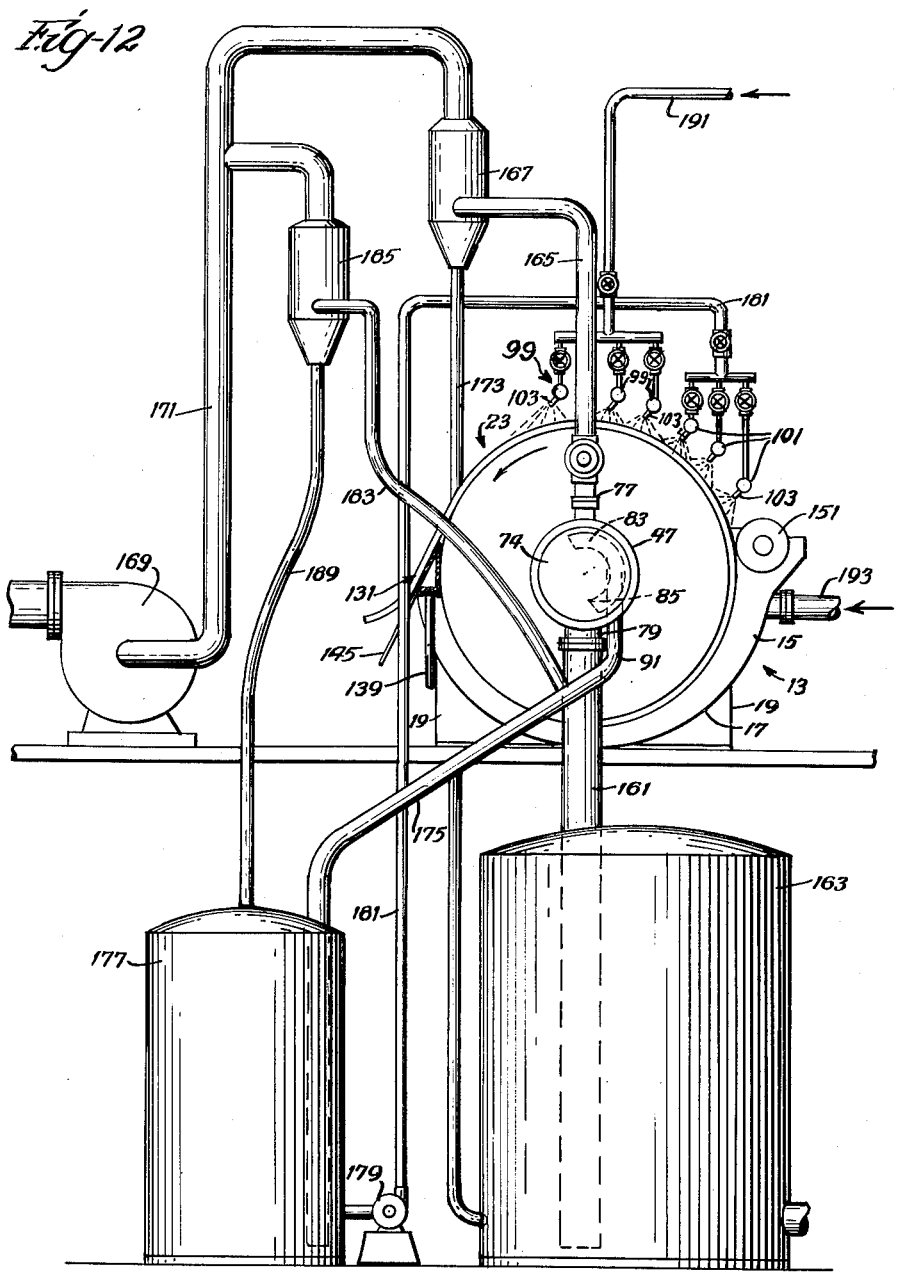
FIG. 12 is an elevational view of a typical installation including a rotary drum pulp washer and filter of this invention.

Two groups of spray pipes 99—99 and 101—101 are used and, as shown in FIGS. 2 and 12, such pipes extend over the drum 23 and are supported between the upper portions of the end plates 15 of the tank 13. The spray pipes 99 and 101 are each provided with a plurality of spray nozzles 103 spaced along the length of the pipes. When the apparatus is operated as a two-stage pulp washer and filter the pipes 101 are connected to spray a "weak liquor" wash over the portion of the layer of pulp or filter cake wherein the sectors are subjected to the suction in the discharge head 47 and the pipes 99 are connected to spray a clear water wash over the portion of the layer of pulp or filter cake wherein the sectors are subjected to the suction in the valve shoe 83, the pipes 101 and 99 being connected, respectively, to a "weak liquor" supply line 181 and a clear water supply line 191 as will be more fully described in connection with FIG. 12.

One of the important features of this invention is the convertibility of the apparatus from a two-stage washer and filter to a single-stage washer and filter, and vice versa. By merely removing the length of conduit 95 interconnecting the valve shoe 83 and the "weak liquor" pipe 91 and capping the upper end of the latter within the discharge head 47, all of the openings 82 in the wear plate 81 in communication with the interior of the valve shoe 83 will also be exposed to the suction in the discharge head 47 and the fluid or liquor withdrawn from the sectors in communication with such openings will be discharged through the valve shoe discharge opening 93 into the discharge head 47 and out the main or "strong liquor" discharge opening 79. The removable cover plate 105 (FIG. 4) on the outer end wall 74 of the discharge head 47 permits ready access to the interior whereby the conduit 95 may be readily removed and the weak liquor pipe 91 capped, or vice versa, thus permitting the apparatus to be operated either as a single-stage or a two-stage washer and filter as desired.

Improved sealing means have been provided between the rotatable filter drum 23 and the stationary discharge heads or suction housings 47, and a preferred embodiment thereof is best shown in FIG. 4. In this embodiment a circumferential flange or ring member 107 is secured on the outer surface of the manifold plate 69 encircling the ports 68 therein and extending through an opening 108 provided therefor in the end plate 15 of the tank 13. The outer end of the flange or ring 107 lies within and approximately even with the open side of the discharge head 47 as shown. An annular sealing member or gasket 109 formed of rubber or rubber-like material is secured to the edge of the opening 108 in the end plate 15 of the tank 13 such as by bolts 111 and has one split lip portion 113 extending inwardly into sealing engagement with the rotatable flange member 107 and a second split lip portion 115 having sealing engagement with the stationary discharge head or suction housing 47. Since the outer surfaces of both the split portions 113 and 115 are subjected to atmospheric pressure and the inner surfaces are exposed to the vacuum or suction within the discharge head 47, there is a differential in pressure which creates a very effective seal between the stationary discharge head 47 and the rotatable drum 23.

A second effective sealing means between the drum 23 and the discharge head or suction housing 47 is shown in FIG. 10. In this embodiment, an annular, angle member 116 is provided which has one leg 117 extending in a plane normal to the axis of the drum 23 and secured by welding or otherwise to the edge of the opening 108 in the end plate 15 in the tank 13 with the other leg 119 surrounding the inner end of discharge head or suction housing 47 in coaxial spaced arrangement, as shown. An annular closing ring 121 is removably attached to the leg 117 and the exterior of the discharge head 47 so as to define with the leg 119 an annular U-shaped recess 123 opening toward the manifold plate 69. An air bag 125, in the form of an elongated tube closed at its opposite ends, is disposed in the recess 123 with the closed ends abutting, and has a stem 127 projecting through a hole in ring 121 and connected to a compressed air supply maintained at a constant predetermined pressure. A sealing gasket 129 disposed in the outer end of the recess 123 is urged by the air pressure in the bag 125 into engagement with the manifold plate 69 to provide a seal between the rotatable drum 23 and the stationary discharge head 47. With this seal arrangement, as the drum 23 warms up and expands when the apparatus is put into operation from the "down" condition, it will compress the air bag 125. However, since the pressure in the air bag 125 is maintained constant, the gasket 129 is held against the plate 69 with uniform pressure and no drag or braking action is created requiring extra power to overcome.

With a rotary drum washer and filter of the type disclosed herein, a doctor is usually utilized to lift the layer of pulp from the drum. It is obviously a great advantage to be able to position such a doctor so as to provide a maximum degree of rotation of the drum with the layer of pulp or filter cake retained thereon and exposed to the suction action. With the drum construction disclosed herein wherein each drainage trough has a separate discharge conduit 61 leading directly therefrom to a port 68 in the manifold plate 69 and disposed substantially in a radial plane passing through the axis of the drum 23, it is possible to position a doctor with the nose thereof disposed substantially in a horizontal plane passing through the axis of the drum 23, without there being any danger of back flow of fluid or liquor withdrawn from the filter cake into the washed layer of pulp or filter cake before its removal from the drum. With the usual drum construction, it is necessary to position the doctor considerably above the middle of the drum to prevent such reverse flow of liquor withdrawn from the filter cake. This means there is substantial reduction of the degree of rotation of the drum during which the filter cake is exposed to a suction action and consequently the effective filter area is materially reduced with a directly proportional reduction in capacity. As shown in FIG. 5, a doctor indicated, generally, by the reference numeral 131 may be positioned relative to the rotary drum 23 disclosed herein with the tip of its nose disposed substantially in a horizontal plane passing through the axis of the drum 23.

The particular doctor 131 disclosed herein for use with the rotary drum of the invention is shown in FIG. 11 and includes an elongated steam chamber 132 extending longitudinally for the length of the drum 23 and having a right triangular vertical section including a vertical side 133, a horizontal base 135, extending away therefrom, and a connecting side 137. The chamber 132 being of small cross section is adapted to withstand a relatively high internal pressure without reinforcement. The base 135 has an opening therein adapted to receive a steam inlet pipe or conduit 139. The apex or nose 141 at the junction of the connecting side 137 and the vertical side 133 is flattened and provided with a series of uniformly spaced steam discharge openings 143. By maintaining a proper steam pressure in the chamber 132, the jet of steam discharged through the opening 143 acts to lift the layer of pulp or filter cake from the drum 23 without the necessity of scraping the layer of pulp from the drum 23 through positive, physical contact of the doctor therewith. In order to provide a supporting surface for the layer of pulp which has been removed from the drum 23 by the jet of steam, a relatively light-weight apron 145 is provided which has a flanged portion secured to the base 135 by bolts 147, the supporting portion of the apron 145 extending angularly away therefrom in alignment with the connecting side 137.

With the doctor 131 disclosed herein, it is noted that the chamber 132 is relatively small and that only the chamber 132 is actually subjected to the steam pressure. The apron 145 may be formed of inexpensive light gauge sheet material. The resulting structure thus provides a doctor which is economical to manufacture, requires a minimum of steam in operation, and produces a minimum of steam condensate.

To improve the formation of the layer of pulp or filter cake, a squeegee roll 151 (FIGS. 2 and 5) is journaled on the depending ends of a pair of bell crank levers 153 which are pivotably mounted on the two end plates 15 of the tank 13. The squeegee roll 151 bears against the outer surface of the drum 23 and helps to smooth the sheet of pulp formed thereupon as well as serving as a dam preventing the return flow of wash liquor from the group of spray pipes 99 and 101 back into the tank. The light pressure of the roll 151 against the drum 23 may be varied by adjusting the position of counterweights 155 carried on lever arms 157 which extend generally normally away from the bell crank levers 153. The squeegee roll 151 is preferably covered with a filter cloth 159, such as is used upon the drum 23.

The rotary drum pulp washer and filter unit described above is operated as part of an installation comprising a pump, a suction blower, separators, storage tanks, and piping as shown in FIG. 12. When operated as a multi or two-stage washer and filter, "strong liquor" withdrawn from the layer of pulp or filter cake is discharged from the opening 79 in the discharge head 47 through a pipe 161 into a "strong liquor" storage tank 163. A suction line 165 connected to the discharge head suction opening 77 leads to a suitable separator or liquid trap 167, the top or take-off of which is connected to the suction opening of a blower 169 by a pipe 171. Any "strong liquor" separated in the trap 167 is returned to the "strong liquor" tank 163 by a pipe 173. "Weak liquor" leaving the "weak liquor" drain pipe 91 passes along a pipe 175 into a "weak liquor" storage tank 177 from it may be withdrawn by a pump 179 and delivered under pressure to the group of spray pipes 101 through a conduit 181. A suction conduit 183 connected to the conduit 91 adjacent the drum filter 23 leads to a separator or liquid trap 185, the top or take-off of which is connected to the suction vacuum line 171 leading to the blower 169, with fluid or liquor separated therein being returned to the "weak liquor" storage tank 177 through a conduit 189. The clear (and preferably hot) water spray pipes 99 are connected to a water supply line 191. The paper pulp stock is admitted to the tank trough 17 through a flanged inlet pipe 193.

In operation, the drum 23 revolves in the tank 13 with the pulp being accumulated upon the submerged surface of the drum 23 under the influence of the suction to which the submerged sectors are subjected. This suction is induced in the discharge head or suction housing 47 by the pump 169 which, through the uncovered openings 82 in the wear plate 81 is in communication with the drainage conduits 61 of the submerged drum sectors. The suction is continuously applied to each drum sector from shortly after its submergence in the pulp mixture in the tank 13 until shortly after the sector passes beyond the "weak liquor" sprays or shower from the pipes 101.

When a sector leaves the pulp mixture in the tank 13 in its ascending travel as the drum rotates, counterclockwise as viewed in FIG. 5, the liquor withdrawn by the suction and gravity flows as a series of small streams down the two drainage troughs 54 and 56 extending side by side in each sector. From the troughs the liquor flows through the drainage conduit 61 leading from each drainage trough, through the ports 68 in the manifold plate 69 and the openings 82 in the wear plate 81 and into the discharge head or suction housing 47 from which it is discharged through the main or "strong liquor" discharge opening 79 into the "strong liquor" storage tank 163. As discussed above, the double tapered configuration of each drainage trough 54 and 56 provides a substantially uniform velocity flow in each trough of liquor withdrawn from the layer of pulp or filter cake and thus a substantially uniform suction action on the layer of pulp or filter cake longitudinally along each sector to provide a better formed layer of pulp or filter cake.

During part of the ascending travel of the drum 23 out of the pulp slurry, the pulp adhering to the drum periphery is given its first stage washing by "weak liquor" from the spray pipes 101. At some point between the "weak liquor" spray from the pipes 101 and the fresh water spray from the pipes 99 each sector has the port 68 to which its drainage conduit 61 is connected transferred by the valve means from communication with the suction on the interior of the discharge head 47 to communication with the suction on the interior of the valve shoe 83 and the "weak liquor" discharge pipe 91 associated therewith. During the period each sector has its discharge conduit 61 in communication with the valve shoe 83, the layer of pulp thereon is passing under the second stage of washing in which it is sprayed with fresh water from the pipes 99. The "weak liquor" formed in this period flows into the discharge pipe 91 and then into the "weak liquor" storage tank 177 for re-use in the "weak liquor" spray pipes 101.

After a sector starts its descending path of travel, it is still subjected to suction from the "weak liquor" suction pipe 183 and is discharging to the "weak liquor" storage tank 177. During this stage of its descending path the tendency of the liquor in the drainage troughs 54 and 56 and the discharge conduits 61 to surge outwardly into the layer of pulp or filter cake is eliminated due to the radial disposition of the drainage conduits 61, at least until the sector has passed below a horizontal plane extending through the axis of the drum 23 by which time the layer of pulp or filter cake has been removed from the drum 23 by the doctor 131.

Shortly before each sector encounters the doctor 131, its drainage conduits 61 are blocked off from any suction action by coming into contact with the blocking plates 85 of the valve means which effectively block the openings 82 in the wear plate 81 until after the sector has been again submerged in the pulp slurry in the tank 13.

The squeegee roll 151 acts upon the layer of pulp or filter cake to smooth it and compress it into a porous sheet of pulp before it is exposed to first the "weak liquor" spray and then the clear water spray.

After emerging from the clear water spray, and after having been subjected to suction for a sufficient length of time to permit adequate removal of liquid from the layer of pulp or filter cake, the washed sheet of pulp is lifted and diverted from the drum 23 by the steam doctor 131.

It will be understood that certain changes may be made in the construction or arrangement of the rotary drum pulp washer and filter disclosed herein without departing from the spirit and scope of the invention as defined in the appended claims.

I claim:

1. In a rotary drum washer and suction filter of the type described having, a filter drum circumferentially subdivided into a plurality of sectors extending longitudinally of the drum and rotatable about a horizontal axis with its bottom portion normally submerged in a slurry of pulp or the like, a stationary housing at an end of the drum having an open side disposed against a manifold plate mounted in the end of the drum and provided with a suction connection and a drain connection, conduit means connecting the drum sectors to ports in the manifold plate to place them under suction for withdrawing fluid from a layer of pulp formed on the periphery of the drum and to discharge the fluid through the drain connection, and doctor means for removing the layer of pulp from the drum, the improvement which comprises, an elongated longitudinally extending drainage deck in each sector spaced inwardly from a perforated plate disposed at the outer end of each sector and having a configuration defining a pair of circumferentially spaced double-tapered drainage troughs extending along the longitudinal sides of the deck and opening outwardly of the drum with said troughs increasing progressively in both depth and width from opposite ends thereof toward the center, and a conduit connecting the deepest portion of each drainage trough to a port in the manifold plate.

2. In a rotary drum washer and suction filter of the type described having, a filter drum circumferentially subdivided into a plurality of sectors extending longitudinally of the drum and rotatable in a tank about a horizontal axis with its bottom portion normally submerged in a slurry of pulp or the like, a stationary housing at an end of the drum having an open side disposed against a manifold plate mounted in the end of the drum and provided with a suction connection and a drain connection, conduit means connecting the drum sectors to ports in the manifold plate to place them under suction for withdrawing fluid from a layer of pulp formed on the periphery of the drum and to discharge the fluid through the drain connection, and doctor means for removing the layer of pulp from the drum, the improvement which comprises, a drainage deck having a side portion secured longitudinally between the ends of the drum and disposed in a radial plane passing through the axis of the drum with the inner edge thereof forming a wide V opening away from the axis of the drum, a first angular portion extending outwardly and away from said inner edge to define a first drainage trough therebetween which opens outwardly of the drum, a chordal portion extending away from said first angular portion normally to a radial plane of the drum bisecting the sector, and a second angular portion extending inwardly and away from said chordal portion and having a terminal edge forming a wide V opening away from the axis of the drum and abutting against a radially disposed side portion of the next adjacent deck to which it may be secured by an external weld bead to define a second drainage trough therebetween which opens outwardly of the drum, said chordal portion decreasing progressively in width from opposite ends of the deck toward the longitudinal center thereof so that said drainage troughs increase progressively not only in depth but also in width from opposite ends thereof toward the center, and means defining an opening at the deepest portion of each trough for connecting each trough to a suction drainage conduit, said double-tapered drainage troughs insuring uniform velocity of flow of fluid withdrawn from the layer of pulp as a result of the suction applied to the sectors through said drainage conduits.

3. In a rotary drum washer and suction filter of the type described having, a filter drum circumferentially subdivided into a plurality of sectors extending longitudinally of the drum and rotatable about a horizontal axis with its bottom portion normally submerged in a slurry of pulp or the like, conduit means connecting the drum sectors to a source of suction for withdrawing fluid from a layer of pulp formed on the periphery of the drum, and doctor means for removing the layer of pulp from the drum, the improvement which comprises, a pair of elongated longitudinally aligned drainage decks in each sector, said decks extending from the longitudinal center f the drum toward opposite ends thereof, each circumferentially spaced drainage deck defining a pair of drainage troughs along the longitudinal sides thereof which open outwardly of the drum with said troughs increasing progressively in both depth and width from opposite ends of the drainage deck toward the center thereof, a stationary suction housing disposed at each end of the drum and having an open side disposed against a manifold plate disposed in each end of the drum, and a suction drainage conduit free from any abrupt bends connected between the deepest and widest portion of each trough and a port in the manifold plate at the nearest end of the drum opening into the associated suction housing, said construction providing a minimum length discharge path for fluid withdrawn from the layer of pulp for any rotary drum of a given length.

4. In a rotary drum washer and suction filter of the type described having, a filter drum circumferentially subdivided into a plurality of sectors extending longitudinally of the drum and rotatable in a tank about a horizontal axis with its bottom portion normally submerged in a slurry of pulp or the like, a stationary housing at an end of the drum having an open side disposed against a manifold plate mounted in the end of the drum and provided with a suction connection and a drain connection, conduit means connecting the drum sectors to ports in the manifold plate to place them under suction for withdrawing fluid from a layer of pulp formed on the periphery of the drum and to discharge the fluid through the drain connection, and doctor means for removing the layer of pulp from the drum, the improvement which comprises, an elongated drainage deck for each sector spaced inwardly a short distance from the periphery of the drum and extending longitudinally thereof, each deck defining a pair of circumferentially spaced drainage troughs extending longitudinally along the sides of each sector and opening outwardly of the drum, each trough increasing progressively in both depth and width from opposite ends of said drainage deck toward the center thereof where a suction drainage conduit is connected to each trough to drain off fluid withdrawn by suction from the layer of pulp, the double-tapered configuration of said drainage troughs insuring a uniform velocity of flow in said troughs of fluid withdrawn from the layer of pulp and thus an even suction effect on the layer of pulp longitudinally along each sector.

5. In a rotary drum washer and suction filter of the type described having, a filter drum circumferentially subdivided into a plurality of sectors extending longitudinally of the drum and rotatable in a tank about a horizontal axis with its bottom portion normally submerged in a slurry of pulp or the like, a stationary housing at an end of the drum having an open side disposed against a manifold plate mounted in the end of the drum and provided with a suction connection and a drain connection, conduit means connecting the drum sectors to ports in the manifold plate to place them under suction for withdrawing fluid from a layer of pulp formed on the periphery of the drum and to discharge the fluid through the drain connection, and doctor means for removing the layer of pulp from the drum, the improvement which comprises, an elongated drainage deck in each sector defining a pair of circumferentially spaced longitudinally extending drainage troughs opening outwardly of the drum, each trough increasing progressively in both depth and width from opposite ends thereof toward a central opening formed in the bottom thereof a suction conduit for each trough connected between said opening therein and a port in the manifold plate and disposed generally in a radial plane passing through the axis of the drum, and means supporting the doctor means in an upright position with the upper edge of its nose for removing a layer of pulp being disposed substantially in alignment with a horizontal plane extending through the axis of the drum, the provision of a separate, radially disposed conduit leading directly from each discharge trough to a manifold port permitting positioning of the doctor means to provide a maximum, effective drum area under suction by insuring no reverse flow of fluid back toward the layer of pulp until each sector has been rotated downwardly past the horizontal plane passing through the axis of the drum, and thus, past the pulp removing nose of the doctor means.

6. For use in a rotary drum pulp washer and filter of the class described, a drainage deck comprising, a side portion disposed in a radial plane passing through the axis of the drum with the inner edge thereof forming a wide V having a vertex disposed nearest the axis of the drum and equidistant between the ends of the deck, a first angular portion extending outwardly and away from said inner edge, a chordal portion extending away from said first angular portion and normally to a radial plane of the drum bisecting the sector, said chordal portion decreasing progressively in width from opposite ends of the deck toward the center thereof, a second angular portion extending inwardly and away from said chordal portion and terminating in an edge portion disposed in a radial plane of the drum and forming a wide V having a vertex disposed nearest the axis of the drum and equidistant from the ends of the deck, said side portion and said first angular portion defining a first drainage trough in the sector opening outwardly of the drum and increasing progressively in both depth and width from opposite ends of the deck toward the center thereof, said terminal edge portion of said second angular portion adapted to abut against and be secured to the inner, wide V-shaped edge of the side portion of the next adjacent drainage deck so that said second angular portion and the side portion of the next adjacent drainage deck define a second drainage trough in the sector opening outwardly of the drum and increasing progressively in both depth and width from opposite ends of the deck toward the center thereof, and means connecting the deepest and widest portion of each drainage trough to a suction and drainage conduit.

References Cited in the file of this patent

UNITED STATES PATENTS

| | | |
|---|---|---|
| 1,223,245 | Biesel | Apr. 17, 1917 |
| 1,930,128 | Lund | Oct. 10, 1933 |
| 2,070,074 | Young | Feb. 9, 1937 |
| 2,072,586 | Grant | Mar. 2, 1937 |
| 2,174,748 | Hunter | Oct. 3, 1939 |
| 2,263,852 | Oliver | Nov. 25, 1941 |
| 2,289,762 | Duvall | July 14, 1942 |
| 2,362,300 | Nyman | Nov. 7, 1944 |
| 2,555,367 | Peterson | June 5, 1951 |
| 2,669,360 | Little | Feb. 16, 1954 |
| 2,696,309 | Bultman | Dec. 7, 1954 |

FOREIGN PATENTS

| | | |
|---|---|---|
| 610,032 | France | Aug. 12, 1925 |